United States Patent
Chang et al.

(10) Patent No.: US 8,368,714 B2
(45) Date of Patent: Feb. 5, 2013

(54) CURVED SURFACE RENDERING SYSTEM AND METHOD

(75) Inventors: Chih-Kuang Chang, Taipei Hsien (TW); Xin-Yuan Wu, Shenzhen (CN); Xiao-Chao Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 762 days.

(21) Appl. No.: 12/577,260

(22) Filed: Oct. 12, 2009

(65) Prior Publication Data

US 2010/0271369 A1 Oct. 28, 2010

(30) Foreign Application Priority Data

Apr. 27, 2009 (CN) .......................... 2009 1 0301881

(51) Int. Cl.
G09G 5/00 (2006.01)
G06T 15/00 (2011.01)
(52) U.S. Cl. ....................... 345/585; 345/419
(58) Field of Classification Search .................. 345/419, 345/585
See application file for complete search history.

(56) References Cited

U.S. PATENT DOCUMENTS

| | | | | |
|---|---|---|---|---|
| 5,774,696 A * | 6/1998 | Akiyama | | 716/52 |
| 5,798,764 A * | 8/1998 | Akiyama | | 345/423 |
| 6,088,511 A * | 7/2000 | Hardwick | | 717/149 |
| 6,356,263 B2 * | 3/2002 | Migdal et al. | | 345/423 |
| 6,445,390 B1 * | 9/2002 | Aftosmis et al. | | 345/421 |
| 7,023,432 B2 * | 4/2006 | Fletcher et al. | | 345/419 |
| 2002/0050988 A1 * | 5/2002 | Petrov et al. | | 345/418 |
| 2002/0085046 A1 * | 7/2002 | Furuta et al. | | 345/848 |
| 2003/0067461 A1 * | 4/2003 | Fletcher et al. | | 345/420 |
| 2004/0001645 A1 * | 1/2004 | Snyder | | 382/276 |
| 2004/0125103 A1 * | 7/2004 | Kaufman et al. | | 345/419 |
| 2005/0062743 A1 * | 3/2005 | Marschner et al. | | 345/473 |
| 2005/0219245 A1 * | 10/2005 | Tao | | 345/424 |
| 2006/0139348 A1 * | 6/2006 | Harada et al. | | 345/420 |
| 2007/0002043 A1 * | 1/2007 | Guenter et al. | | 345/420 |
| 2009/0146995 A1 * | 6/2009 | Van Bael et al. | | 345/419 |

OTHER PUBLICATIONS

Lee et al.; Two Algorithms for Constructing A Delaunay Triangulation; 1980; International Journal of Computer and Information Sciences; Plenum Publishing; vol. 9, No. 3; pp. 219-242.*

Field; LaPlacian Smoothing and Delaunay Triangulations; 1988; Communications in Applied Numerical Methods; Wiley & Sons; vol. 4; pp. 709-712.*

Ruppert; A Delaunay Refinement Algorithm for Quality 2-Dimensional Mesh Generation; Feb. 2, 1994; Submission to Journal of Algorithms; pp. 1-46.*

Chew; Guaranteed-Quality Delaunay Meshing in 3D; 1997; SCG '97 Proceedings of the Thirteenth Annual Symposium on Computational Geometry; ACM; pp. 391-393.*

* cited by examiner

*Primary Examiner* — David T Welch

(74) *Attorney, Agent, or Firm* — Altis Law Group, Inc.

(57) ABSTRACT

A curved surface rendering method grids a curved surface to a plurality of triangles, and further divides the plurality of triangles to sub-triangles. Furthermore, the method determines surface triangles and inner triangles from all triangles of the curved surface, and displays the surface triangles on a display device.

10 Claims, 13 Drawing Sheets

CURVED SURFACE RENDERING SYSTEM AND METHOD

BACKGROUND

1. Field of the Invention

Embodiments of the present disclosure relates to computer aided design (CAD), and more particularly, to a curved surface rendering system and method.

2. Description of Related Art

A three-dimensional (3D) model of an object may be represented by a plurality of freeform curved surfaces. The curved surfaces may be represented by either a plurality of points or dense triangular (or other shaped) meshes which form outlines of the 3D object. At present, an iterative algorithm is widely used for constructing triangular meshes. However, triangles fitted via the iterative algorithm are variform and the fitting speed is very slow. Another popular triangulation method is the Delaunay algorithm, which focuses on improving surface dividing quality. Triangles fitted via the Delaunay algorithm are well-proportioned; however, a large number of triangles are produced by this method, which requires a great deal of time.

What is needed, therefore, is an improved method to overcome the aforementioned problem.

DETAILED DESCRIPTION OF CERTAIN INVENTIVE EMBODIMENTS

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
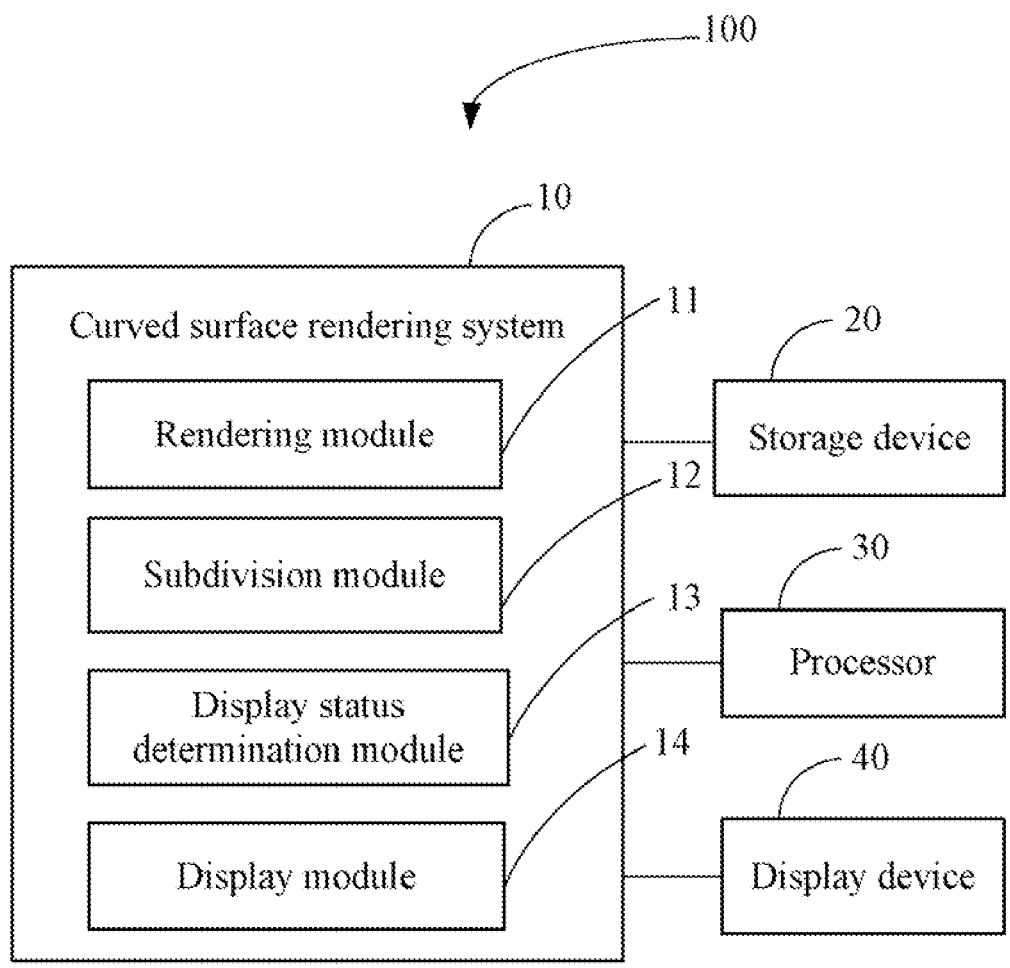
FIG. 1 is a block diagram of one embodiment of a data processing device comprising a curved surface rendering system.

FIG. 1 is a block diagram of one embodiment of a data processing device 100 comprising a curved surface rendering system 10. The data process device 100 further includes a storage device 20, a processor 30, and a display device 40. Depending on the embodiment, the data processing device 100 may be a computer or any other electronic device having data processing function. The storage device 20, which may be a smart media card, a secure digital card, or a compact flash card, stores information about curved surfaces. The information about curved surfaces may include a parametric equation (e.g., $x=j(u, v)$, $y=\psi(u, v)$, $z=c(u, v)$), control points, boundary points, and a three-dimensional (3D) model of each of the curved surfaces. It is understood that control points of each curved surface determines a shape of the curved surface, and boundary points of the curved surface determines a size of the curved surface.

In one embodiment, the curved surface rendering system 10 renders a curved surface using a plurality of triangles, and further divides the plurality of triangles to sub-triangles. Furthermore, the curved surface rendering system 10 determines surface triangles and inner triangles from all triangles of the curved surface, and displays the surface triangles onto the display device 40. As shown in FIG. 1, the curved surface rendering system 10 includes a rendering module 11, a subdivision module 12, a display status determination module 13, and a display module 14. Computerized codes of the modules 11-14 are stored in the storage device 20, the processor 30 executes the computerized codes, to provide one or more operations of the curved surface rendering system 10. It should be understood that the curve surface may be representative of a surface of an object, such as a computer mouse. The curved surface may be obtained using an image measuring machine, for example.

The rendering module 11 reads control points and boundary points of a curved surface from the storage device 20, and renders the curved surface using a plurality of triangles according to the control points and boundary points, so as to generate a triangular curved surface. A detailed description refers to FIG. 3.

The subdivision module 12 subdivides each triangle of the triangular curved surface according to an angle between a normal vector of the triangle and a normal vector of the triangle's neighboring triangle, so as to generate triangles with different subdivision levels. A detailed description refers to FIG. 4.

The display status determination module 13 determines surface triangles and inner triangles from all triangles of the triangular curved surface, so as to obtain display or hiding status information of each triangle of the triangular curved surface. A detailed description refers to FIG. 5.

The display module 14 determines a viewport on the display device 40, and displays the surface triangles of the triangular curved surface in the viewport. It is understood that a viewport is an actual display area of the display screen 40. A detailed description refers to FIG. 6. The display module 14 may also display the surface triangles in different regions of the curved surface or different subdivision levels of surface triangles in one region of the curved surface according to operations on the viewport. Because a display range of the viewport is limited, all surface triangles cannot be displayed at one time in the viewport. However, a user may operate a rotation button of the viewport to view the surface triangles in different regions of the triangular curved surface. If the user clicks a zoom in or zoom out button of the viewport, the display module 14 may display surface triangles in a region with different subdivision levels. For example, if the user clicks the zoom out button, the display module 14 displays more detailed subdivision surface triangles in the region.

Figure 2:
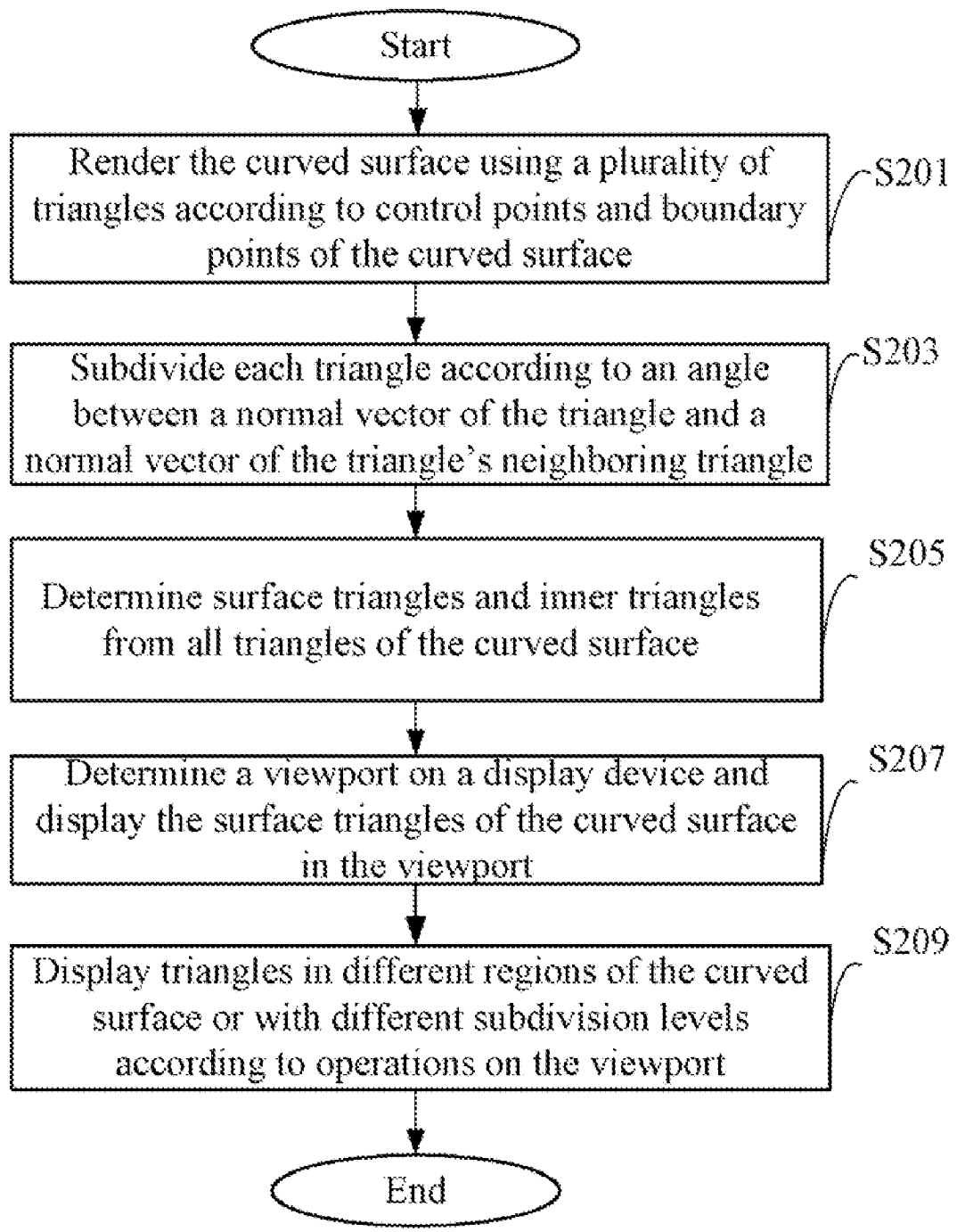
FIG. 2 is a flowchart of one embodiment of a method for rendering a curved surface.

FIG. 2 is a flowchart of one embodiment of a method for rendering a curved surface. Depending on the embodiment, additional blocks may be added, others removed, and the ordering of the blocks may be changed.

Figure 3:
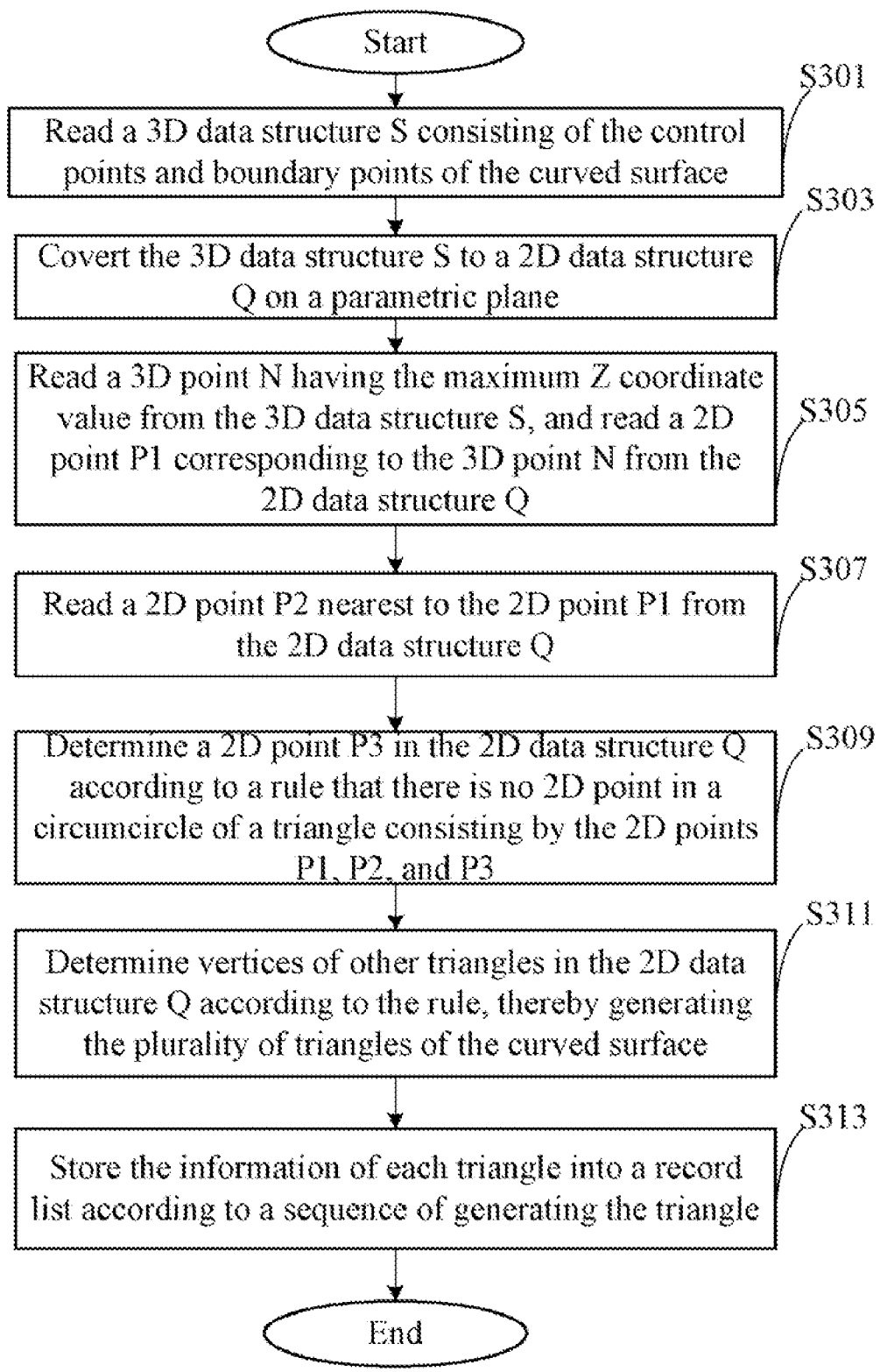
FIG. 3 is a detailed description of block S201 in FIG. 2.
Figure 7:
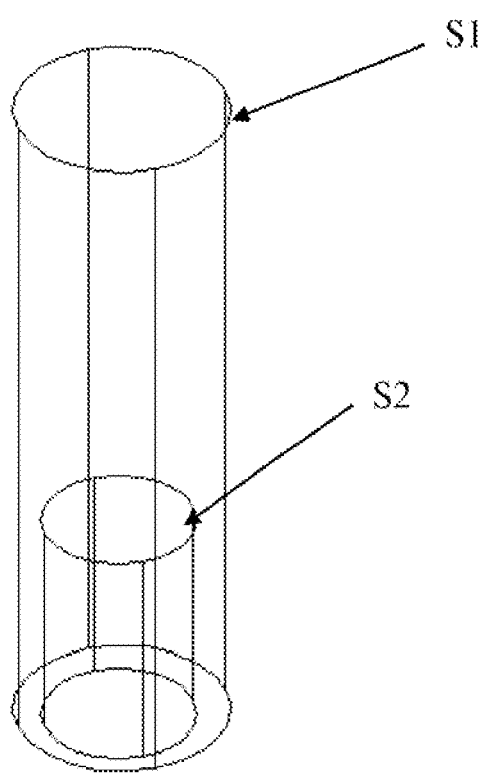
FIG. 7 illustrates a curved surface consisting of an outside surface and an inner surface.

In block S201, the gridding module 11 reads control points and boundary points of a curved surface from the storage device 20, and renders the curved surface using a plurality of triangles according to the control points and boundary points, so as to generate a triangular curved surface (A detailed description is given in FIG. 3). For example, FIG. 7 gives a 3D model of an object that includes an outside surface S1 and an inner surface S2. In one embodiment, the outside surface S1 and the inner surface S2 forms the curved surface. That is, the outside surface S1 and the inner surface S2 are both rendered using triangles.

In block S203, the subdivision module 12 subdivides each triangle of the triangular curved surface according to an angle between a normal vector of the triangle and a normal vector of the triangle's neighboring triangle, so as to generate triangle with different subdivision levels. A detailed description is given in FIG. 4.

Figure 5:
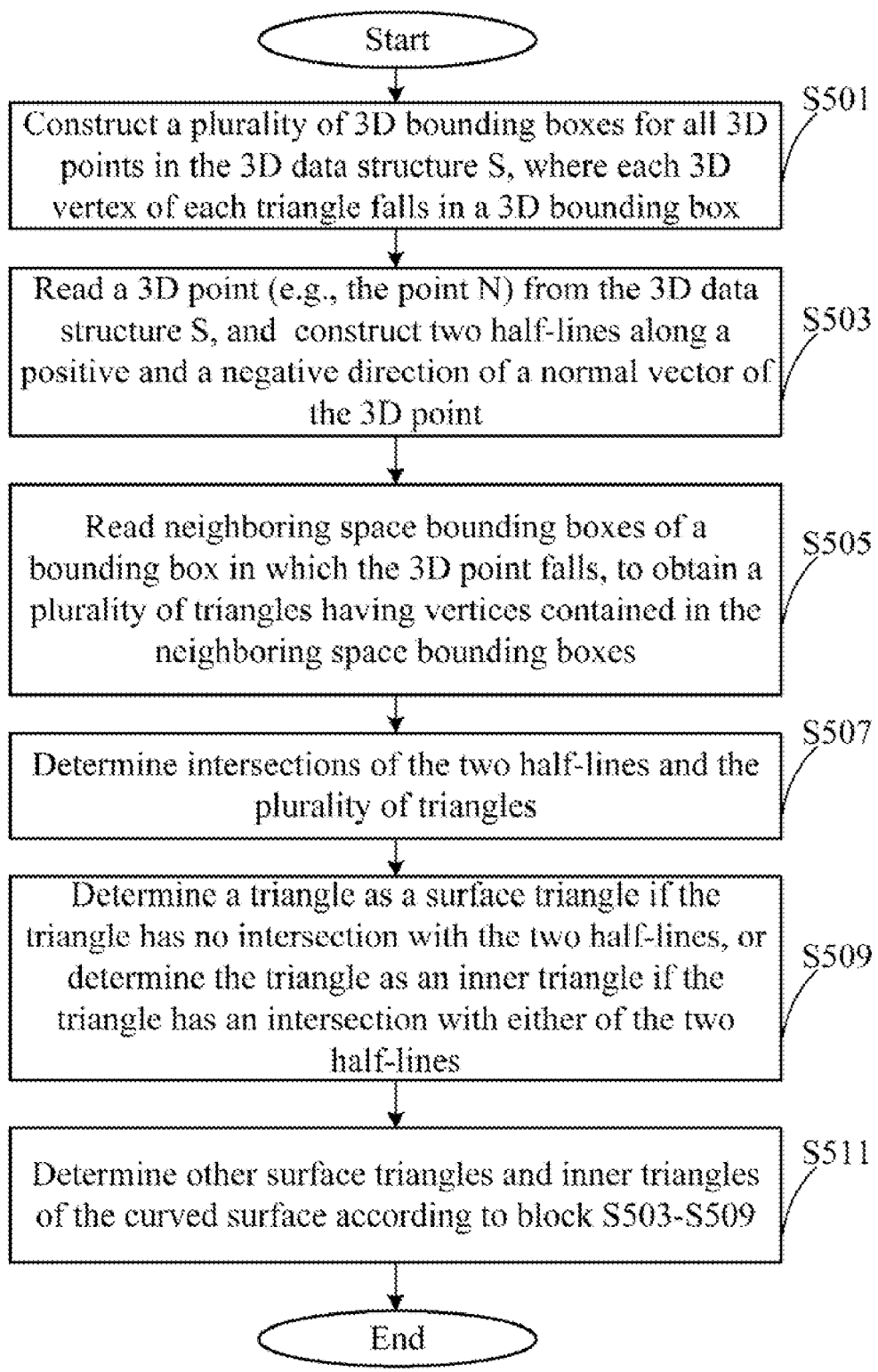
FIG. 5 is a detailed description of block S205 in FIG. 2.
Figure 8:
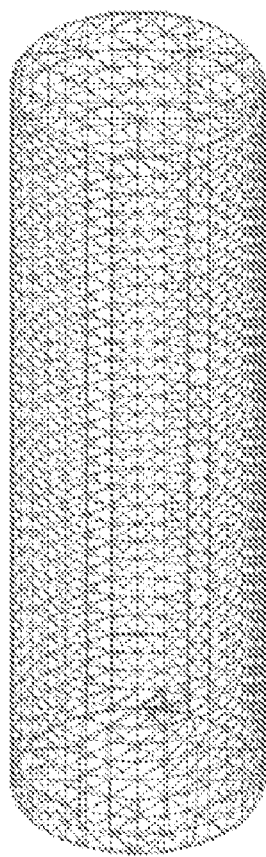
FIG. 8 illustrates surface triangles of the curved surface in FIG. 7.

In block S205, the display status determination module 13 determines surface triangles and inner triangles from all triangles of the triangular curved surface, so as to obtain display or hiding status information of each triangle of the triangular curved surface (A detailed description is given in FIG. 5). As mentioned in block S201, the outside surface S1 and the inner surface S2 shown in FIG. 7 are both rendered using triangles. Triangles of the outside surface S1 are regarded as the surface triangles, and triangles of the inner surface S2 are regarded as the inner triangles. As shown in FIG. 8, the inner triangles are hidden, only the surface triangles are displayed to users.

In block S207, the display module 14 determines a viewport on the display device 40, and displays the surface triangles of the triangular curved surface in the viewport. A detailed description is given in FIG. 6.

Figure 9:
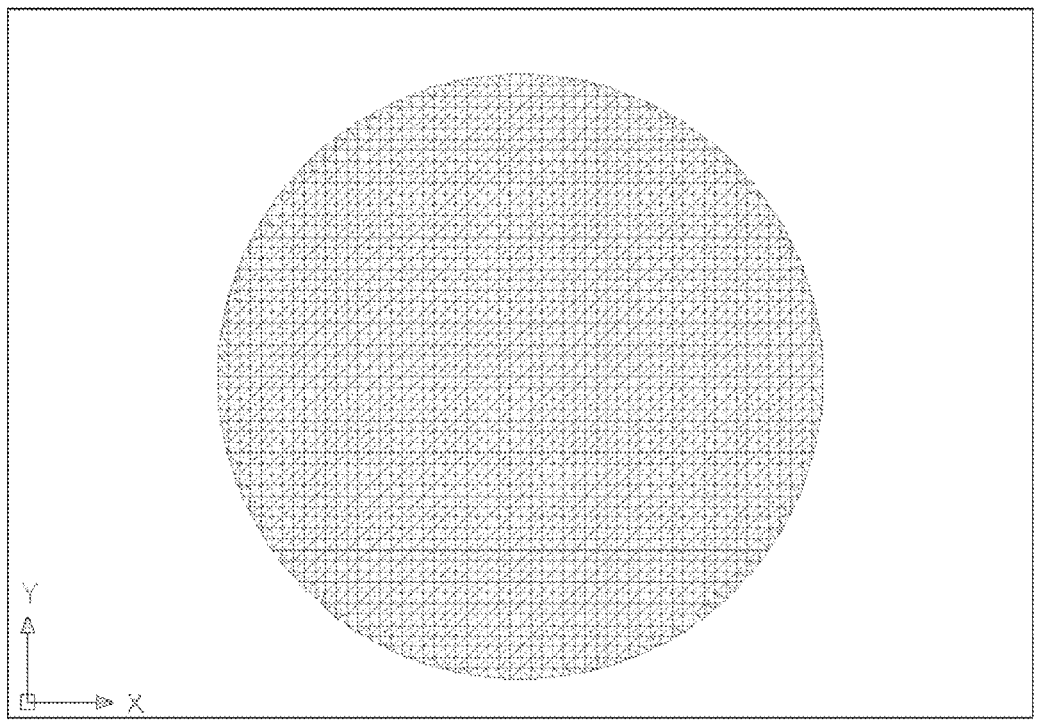
FIG. 9 and FIG. 10 illustrate surface triangles with different subdivision levels in a region of the curved surface according to operations on a viewport.
Figure 10:
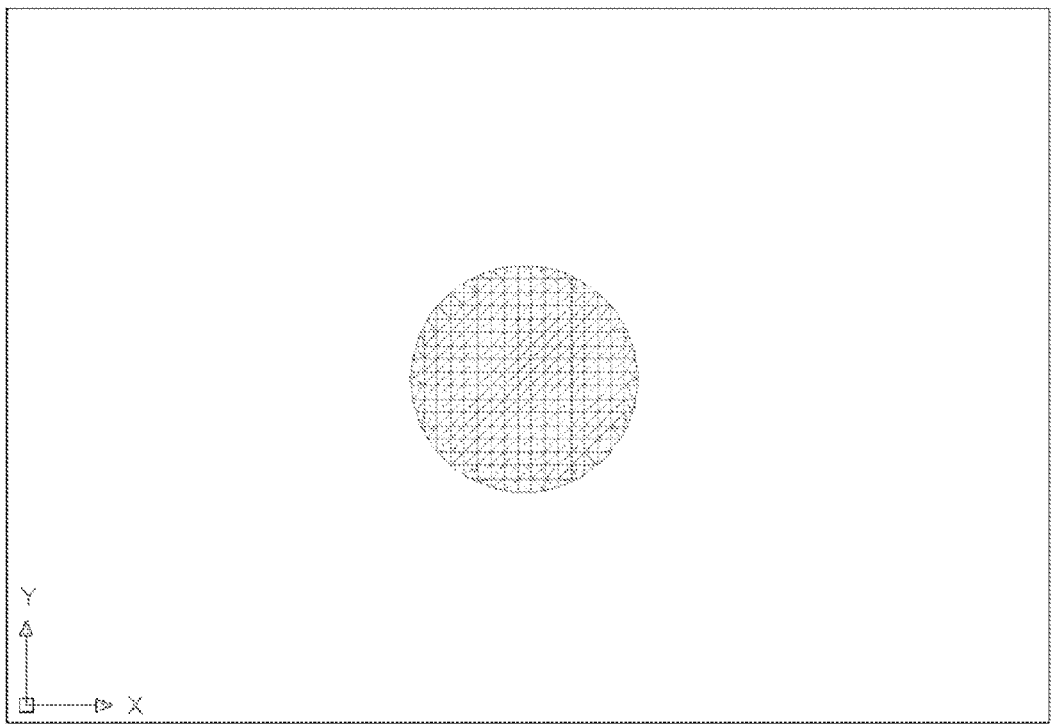

In block S209, the display module 14 displays the surface triangles in different regions of the curved surface or different subdivision levels of surface triangles in a region of the curved surface according to operations on the viewport from a user. For example, the display module 14 may display the surface triangles in certain region (e.g., a top side) of the curved surface. The rectangular area in FIG. 9 and FIG. 10 illustrate the viewport, if the user clicks a zoom out button of the viewport, the display module 14 displays more surface triangles, that is, triangles with more detailed subdivision levels, in this region (as shown in FIG. 9). If the user clicks the zoom in button of the viewport, the display module 14 displays less surface triangles, that is, triangles with rough subdivision levels, in this region (as shown in FIG. 10).

FIG. 3 is a detailed description of block S201 in FIG. 2. Depending on the embodiment, additional blocks may be added, others removed, and the ordering of the blocks may be changed.

In block S301, the gridding module 11 reads a three-dimensional (3D) data structure S consisting of the control points and boundary points of the curved surface.

In block S303, the gridding module 11 converts the 3D data structure S to a two-dimensional (2D) data structure Q on a parametric plane according to a parametric equation of the curved surface, such as $x=j(u, v)$, $y=\psi(u, v)$, and $z=c(u, v)$ that is stored in the storage device 20. Each point of the curved surface may be expressed by 3D coordinates X, Y, and Z, or 2D parameters u and v.

In block S305, the gridding module 11 reads a 3D point N having the maximum Z coordinate value from the 3D data structure S, and reads a 2D point P1 corresponding to the 3D point N in the 2D data structure Q. It is understood that the 3D point N having the maximum Z coordinate value is the outmost point of the curved surface.

In block S307, the gridding module 11 reads a point P2 nearest to the point P1 from the 2D data structure Q, where the points P1 and P2 construct one side of a triangle A1.

Figure 11:
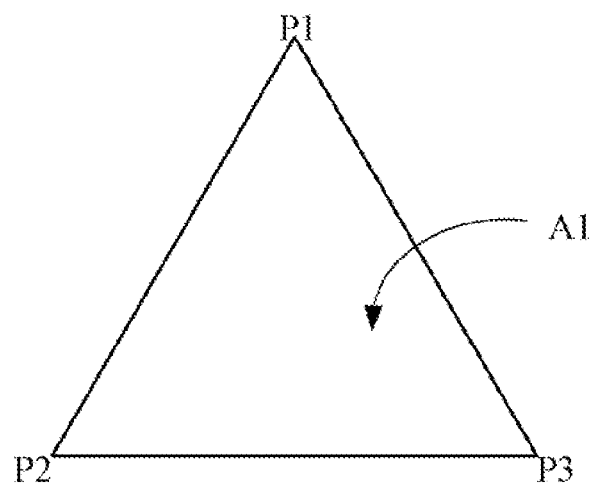
FIG. 11 illustrates a triangle.

In block S309, the gridding module 11 determines a point P3 in the 2D data structure Q according to a determination rule, so as to construct the triangle A1 having the three vertices P2, P2, and P3 (as shown in FIG. 11). The determination rule is that there is no 2D point of the 2D data structure Q within a circumcircle of the triangle A1, so that the triangle A1 approaches to an equilateral triangle.

In block S311, the gridding module 11 determines vertices of other triangles in the 2D data structure Q according to the determination rule, thereby generating the plurality of triangles which are well-proportioned.

In block S313, the gridding module 11 stores the information of each triangle into a record list T1 according to generating sequence of all triangles of the curved surface. In one embodiment, the information of each triangle includes coordinate information of three vertices of the triangle.

Figure 4A:
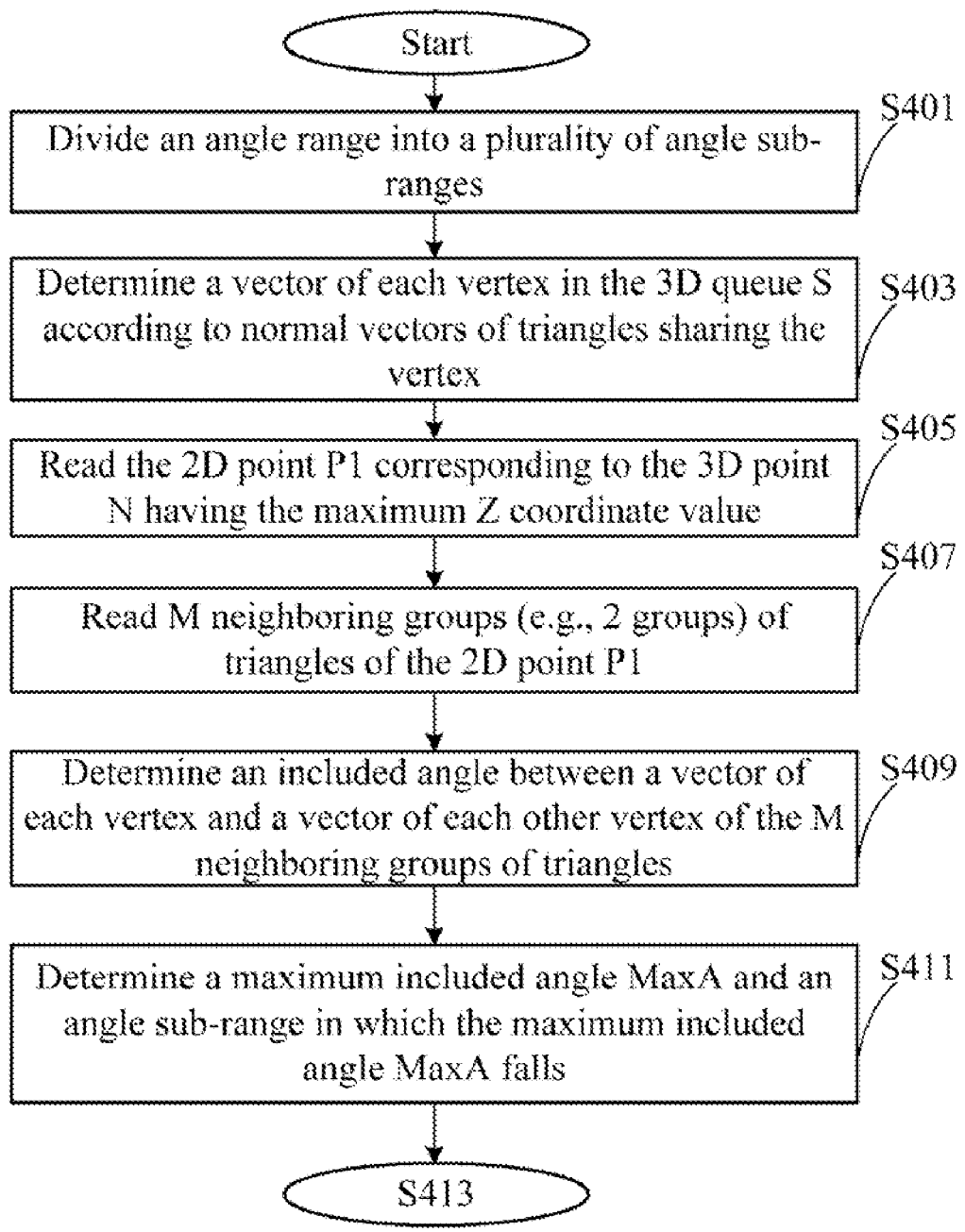
FIG. 4A and FIG. 4B is a detailed description of block S203 in FIG. 2.
Figure 4B:
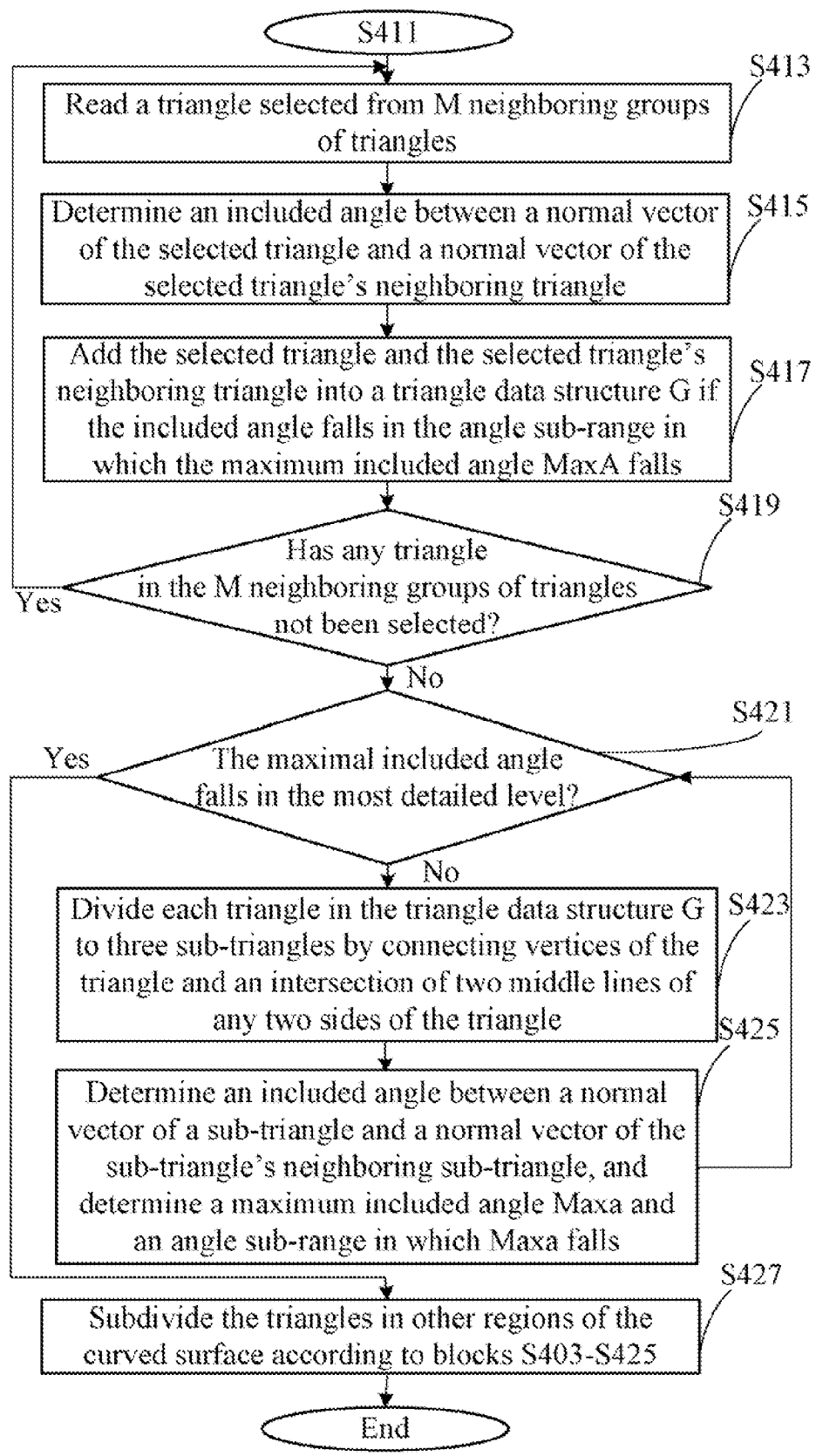

FIG. 4A and FIG. 4B is a detailed description of block S203 in FIG. 2. Depending on the embodiment, additional blocks may be added, others removed, and the ordering of the blocks may be changed.

In block S401, the subdivision module 12 divides an angle range into a plurality of angle sub-ranges. For example, the subdivision module 12 may divide an angle range [0, 90] degrees into nine angle sub-ranges [0, 10], (10, 20], (20, 30], (30, 40], (40, 50], (50, 60], (60, 70], (70, 80], and (80, 90] degrees. Each of the angle sub-ranges corresponds to a subdivision level, such as [0, 10] degrees corresponds to a first subdivision level, (10, 20] corresponds to a second subdivision level, and so on. It is understood that the first subdivision level is the most detailed subdivision level.

In block S403, the subdivision module 12 determines a vector of each vertex in the 3D data structure S according to normal vectors of triangles that share the vertex. It is understood that a vector of a vertex equals an average value of normal vectors of all triangles sharing the vertex. For example, if there are four triangles sharing a vertex B, then a vector of the vertex B equals an average value of the four triangles' normal vectors.

In block S405, the subdivision module 12 reads the 2D point P1 corresponding to the 3D point N having the maximum Z coordinate value.

In block S407, the subdivision module 12 reads a predetermined number M of neighboring groups (e.g., 2 groups) triangles of the 2D point P1. The predetermined number M of neighboring groups triangles refers to M groups of triangles around the point P1. When M=1, a first group of triangles is referred to, when M=2, a first group and a second group of triangles are referred to, and so on. A first group is defined as all triangles of the curved surface having a common vertex of the point P1. A second group is defined as only those triangles having a common vertex with any of the triangles in the first group, and so on.

In block S409, the subdivision module 12 determines an included angle between a vector of each vertex and a vector of each other vertex of the number M of neighboring groups triangles. For example, the subdivision module 12 determines an included angle between a vector of the vertex B and a vector of each other vertex of the neighboring two groups of triangles. As a result, a plurality of included angles between each two vectors of each two vertices of the triangles are obtained by the subdivision module 12.

In block S411, the subdivision module 12 determines a maximum included angle MaxA from the plurality of included angles, and determines an angle sub-range in which the maximum included angle MaxA falls. For example, if MaxA=8 degrees, the subdivision module 12 determines MaxA falls in the angle sub-range [0, 10] degrees, which is the most detailed subdivision level. If MaxA=35 degrees, the subdivision module 12 determines MaxA falls in the angle sub-range (30, 40] degrees, which is the fourth subdivision level.

In block S413, the subdivision module 12 selects a triangle (e.g., the triangle A1) from the predetermined number M of neighboring groups triangles.

In block S415, the subdivision module 12 determines an included angle between a normal vector of the selected triangle and a normal vector of the selected triangle's neighboring triangle. For example, the subdivision module 12 determines an included angle between a normal vector of the triangle A1 and a normal vector of a neighboring triangle A2 of the triangle A1. It is understood that a triangle may have more than one neighboring triangle.

In block S417, the subdivision module 12 adds the selected triangle and the selected triangle's neighboring triangle into a triangle data structure G if their included angle falls in the sub-range in which the maximum included angle MaxA falls. For example, if MaxA=35 degrees, and the included angle between the normal vector of the triangle A1 and the normal vector of the neighboring triangle A2 is 36 degrees, which also fall in the angle sub-rang (30, 40], then the subdivision module 12 adds the triangles A1 and A2 in to the triangle data structure G.

In block 5419, the subdivision module 12 determines if there is any triangle in the predetermined number M of neighboring groups triangles has not been selected. If there is any triangle in the predetermined number M of neighboring groups triangles has not been selected, the procedure returns to block S413. Otherwise, the procedure goes to block S421.

In block S421, the subdivision module 12 determines if the angle sub-range in which the maximum included angle (e.g., MaxA) falls is the most detailed level. If the sub-range in which the maximum included angle falls is not the most detailed level, the procedure goes to block S423. For example, if MaxA=35 degrees, which falls in the angle sub-range (30, 40] degrees that is the fourth subdivision level, the procedure goes to block S423.

Figure 12:
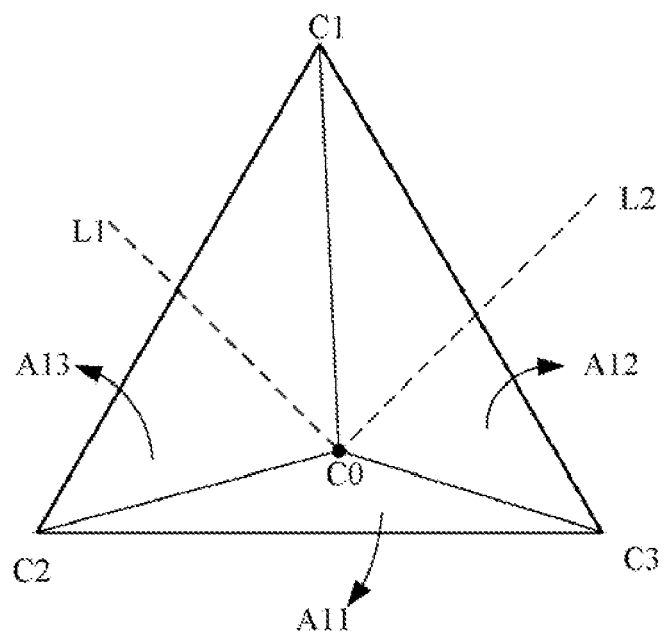
FIG. 12 illustrates subdivision of the triangle.

In block S423, the subdivision module 12 divides each triangle in the triangle data structure G to three sub-triangles by connecting three vertices of the triangle and an intersection of two middle lines of any two sides of the triangle. For example, as shown in FIG. 12, if the triangle A1 has three vertices C1, C2, and C3, there are two middle lines L1 and L2 of two sides C1C2 and C1C3, an intersection of the two middle lines L1 and L2 is a point C0, then the subdivision module 12 divides the triangle A1 to three sub-triangles A11, A12, and A13 by connecting the three vertices C1, C2 and C3 and the intersection point C0 of the two middle lines L1 and L2.

In block S425, the subdivision module 12 determines an included angle between a normal vector of a sub-triangle and a normal vector of the sub-triangle's neighboring sub-triangle. For example, the subdivision module 12 determines an included angle between a normal vector of the sub-triangle A11 and a normal vector of a neighboring triangle A12, determines an included angle between the normal vector of the sub-triangle A11 and a normal vector of a neighboring triangle A13. It may be understood that the sub-triangle A11 may have more than two neighboring triangles. Furthermore, the subdivision module 12 determines a new maximum included angle Maxa and an angle sub-range in which the new maximum included angle Maxa falls. For example, if Maxa=9 degrees, the subdivision module 12 determines the Maxa falls in the angle sub-rang [0, 10] degrees. Then the procedure return to block S421 to determine if the angle sub-range in which the new maximum included angle (e.g., Maxa) falls is the most detailed level. Until an angle sub-range in which a new maximum included angle falls is the most detailed level [0, 10] degrees, subdivision processing of the triangles in the region, which consists of the predetermined number M of neighboring groups triangles of the 2D point P1, is over, then the procedure goes to block S427 from block S421.

In block S421, the subdivision module 12 subdivides the triangles in other regions of the curved surface according to the subdivision processing of the predetermined number M of neighboring groups triangles of the 2D point P1. The subdivision module 12 also stores information of all obtained sub-triangles into corresponding data structures, such as the 2D data structure Q, 3D data structure S, or the triangle data structure G.

FIG. 5 is a detailed description of block S205 in FIG. 2. Depending on the embodiment, additional blocks may be added, others removed, and the ordering of the blocks may be changed.

In block S501, the display status determination module 13 constructs a plurality of 3D bounding boxes for all 3D points in the 3D data structure S, where each 3D vertex of each triangle falls in a corresponding 3D bounding box.

In block S503, the display status determination module 13 reads a 3D point (e.g., the 3D point N) from the 3D data structure S, and constructs two half-lines (e.g., L3 and L4) along a positive and a negative direction of a normal vector of the 3D point.

In block S505, the display status determination module 13 reads neighboring space bounding boxes of a bounding box in which the 3D point falls, to obtain a plurality of triangles having vertices contained in the neighboring space bounding boxes. It is understood that reading of the neighboring space bounding boxes is similar to reading the predetermined number M of neighboring groups of triangles of the 2D point P1 described in paragraph [0036].

In block S507, the display status determination module 13 determines intersections of the two half-lines and the plurality of triangles.

In block S509, the display status determination module 13 determines a triangle as a surface triangle if the triangle has no intersection with the two half-lines, or determines the triangle as an inner triangle if the triangle has an intersection with either of the two half-lines. For example, if the triangle A1 has no intersection with L3 and L4, the triangle A1 is determined as a surface triangle. Otherwise, if the triangle A1 has at least one intersection with L3 or L4, the triangle A1 is determined as an inner triangle. As a result, display or hiding status information of each of the plurality of triangles neighboring the 3D point N is obtained.

In block S511, the display status determination module 13 determines display or hiding status information of triangles in other regions of the curved surface according to the determination processing of the plurality of triangles neighboring the 3D point N.

Figure 6:
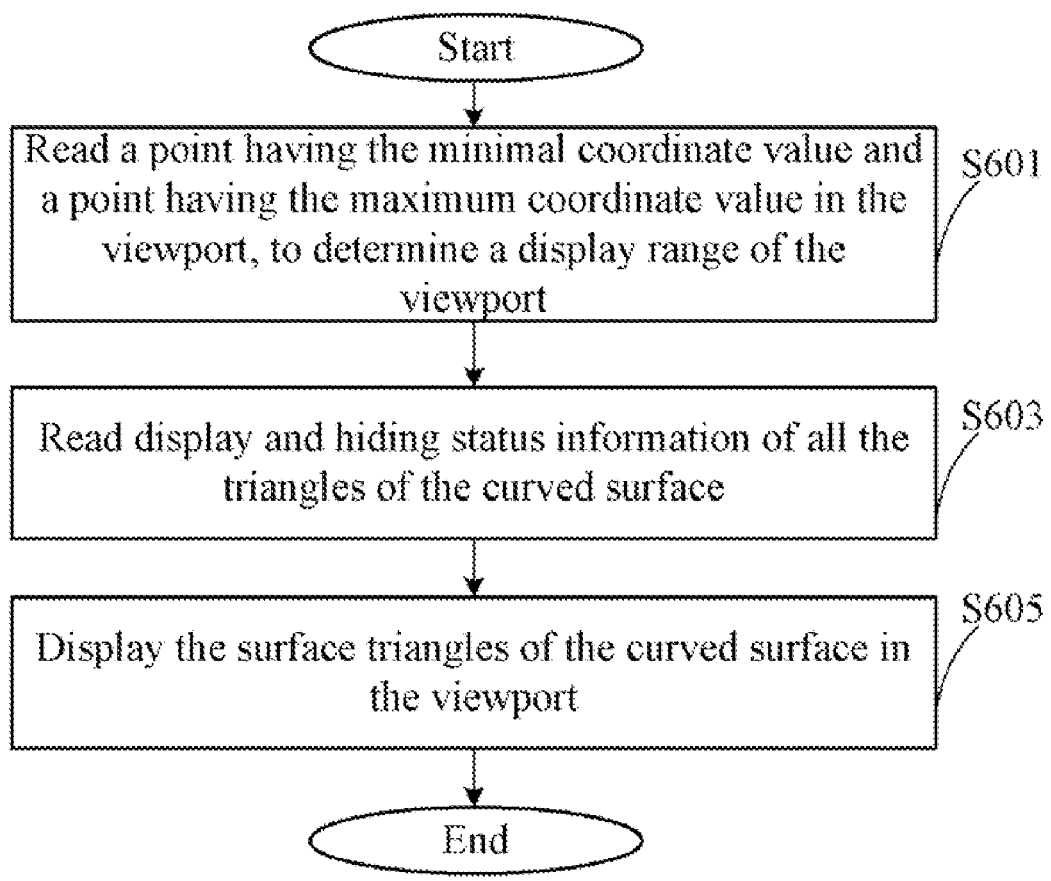
FIG. 6 is a detailed description of block S207 in FIG. 2.

FIG. 6 is a detailed description of block S207 in FIG. 2. Depending on the embodiment, additional blocks may be added, others removed, and the ordering of the blocks may be changed.

In block S601, the display module 14 reads a point having the minimal coordinate value and a point having the maximum coordinate value in the viewport, so as to determine a display range of the viewport.

In block S603, the display module 14 reads display and hiding status information of all triangles of the curved surface.

In block S605, the display module 14 displays the surfaces triangles of the curved surface in the viewport.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A curved surface rendering method implemented in a data processing device, the method comprising:
   (a) reading control points and boundary points of a curved surface of an object from a storage device, and rendering the curved surface using a plurality of triangles according to the control points and boundary points;
   (b) subdividing each triangle of the triangular curved surface according to an angle between a normal vector of the triangle and a normal vector of the triangle's neighboring triangle, to generate triangles with different subdivision levels;
   (c) determining surface triangles and inner triangles from all triangles of the curved surface, so as to obtain display or hiding status information of each triangle of the curved surface;
   (d) determining a viewport on a display device, and displaying the surface triangles of the curved surface in the viewport; and
   (e) displaying the surface triangles in different regions of the curved surface or displaying different subdivision levels of surface triangles in a region of the curved surface according to operations on the viewport;
   wherein block (b) comprises:
   (b1) dividing an angle range into a plurality of angle sub-ranges, wherein each of the angle sub-ranges corresponds to a subdivision level;
   (b2) determining a vector of each vertex in the 3D data structure according to normal vectors of triangles that share the vertex;
   (b3) reading a first 2D vertex corresponding to a first 3D vertex having a maximum Z coordinate value;
   (b4) reading neighboring groups of triangles of the first 2D vertex;
   (b5) determining an included angle between a vector of each vertex and a vector of each other vertex of the neighboring groups of triangles, thereby obtaining a plurality of included angles between each two vectors of each two vertices of the neighboring groups of triangles;
   (b6) determining a maximum included angle from the plurality of included angles, and determining an angle sub-range in which the maximum included angle falls;
   (b7) selecting a triangle from the neighboring groups of triangles;
   (b8) determining an included angle between a normal vector of the selected triangle and a normal vector of the selected triangle's neighboring triangle;
   (b9) adding the selected triangle and the selected triangle's neighboring triangle into a triangle data structure if their included angle falls in the sub-range in which the maximum included angle falls;
   (b10) determining if any triangle in the neighboring groups of triangles has not been selected, if any triangle in the neighboring groups of triangles has not been selected, returning to block (b7), or if all triangles in the neighboring groups of triangles have been selected, going to block (b11);
   (b11) determining if the angle sub-range in which the maximum included angle falls is the most detailed level;
   (b12) dividing each triangle in the triangle data structure to three sub-triangles by connecting three vertices of the triangle and an intersection of two middle lines of two sides of the triangle, if the angle sub-range in which the maximum included angle falls is not the most detailed level;
   (b13) determining an included angle between a normal vector of each sub-triangle and a normal vector of the sub-triangle's neighboring sub-triangle, and determining a new maximum included angle and an angle sub-range in which the new maximum included angle falls;
   (b14) returning to block (b11) to determine if the angle sub-range in which the new maximum included angle falls is the most detailed level, and further dividing the sub-triangles according to blocks (b12)-(b14) until an angle sub-range in which a new maximum included angle falls is the most detailed level; and
   (b15) dividing the triangles in other regions of the curved surface according to subdivision processing from blocks (b4)-(b14) of the neighboring groups of triangles of the first 2D vertex.

2. The method as claimed in claim 1, wherein block (c) comprises:
   (c1) constructing a plurality of 3D bounding boxes for all 3D vertices in the 3D data structure, wherein each 3D vertex of each triangle falls in a corresponding 3D bounding box;
   (c2) selecting a 3D vertex from the 3D data structure, and constructing two half-lines along a positive and a negative direction of a normal vector of the selected 3D vertex;
   (c3) reading neighboring space bounding boxes of a bounding box in which the selected 3D vertex falls, to obtain a plurality of triangles having vertices contained in the neighboring space bounding boxes;
   (c4) determining intersections of the two half-lines and the plurality of triangles;
   (c5) determining a triangle as a surface triangle if the triangle has no intersection with the two half-lines, or determining the triangle as an inner triangle if the triangle has an intersection with either of the two half-lines; and
   (c6) determining display or hiding status information of triangles in other regions of the curved surface according to determination processing from blocks (c2)-(c5).

3. The method as claimed in claim 1, wherein block (d) comprises:
   (d1) reading a point having the minimal coordinate value and a point having the maximum coordinate value in the viewport, so as to determine a display range of the viewport;
   (d2) reading display and hiding status information of all triangles of the curved surface; and
   (d3) displaying the surfaces triangles of the curved surface in the viewport.

4. The method as claimed in claim 1, wherein the storage device is a smart media card, a secure digital card, or a compact flash card.

5. The method as claimed in claim 1, wherein the operations on the viewport comprise zooming in, zooming out, and rotations.

6. A non-transitory storage medium storing a set of instructions, the set of instructions capable of being executed by a processor to perform a method for rendering curved surfaces, the method comprising:
   (a) reading control points and boundary points of a curved surface of an object from the storage medium, and rendering the curved surface using a plurality of triangles according to the control points and boundary points;

(b) subdividing each triangle of the triangular curved surface according to an angle between a normal vector of the triangle and a normal vector of the triangle's neighboring triangle, to generate triangles with different subdivision levels;

(c) determining surface triangles and inner triangles from all triangles of the curved surface, so as to obtain display or hiding status information of each triangle of the curved surface;

(d) determining a viewport on a display device, and displaying the surface triangles of the curved surface in the viewport; and (e) displaying the surface triangles in different regions of the curved surface or displaying different subdivision levels of surface triangles in a region of the curved surface according to operations on the viewport;

wherein block (b) comprises:

(b1) dividing an angle range into a plurality of angle sub-ranges, wherein each of the angle sub-ranges corresponds to a subdivision level;

(b2) determining a vector of each vertex in the 3D data structure according to normal vectors of triangles that share the vertex;

(b3) reading a first 2D vertex corresponding to a first 3D vertex having a maximum Z coordinate value;

(b4) reading neighboring groups of triangles of the first 2D vertex;

(b5) determining an included angle between a vector of each vertex and a vector of each other vertex of the neighboring groups of triangles, thereby obtaining a plurality of included angles between each two vectors of each two vertices of the neighboring groups of triangles;

(b6) determining a maximum included angle from the plurality of included angles, and determining an angle sub-range in which the maximum included angle falls;

(b7) selecting a triangle from the neighboring groups of triangles;

(b8) determining an included angle between a normal vector of the selected triangle and a normal vector of the selected triangle's neighboring triangle;

(b9) adding the selected triangle and the selected triangle's neighboring triangle into a triangle data structure if their included angle falls in the sub-range in which the maximum included angle falls;

(b10) determining if any triangle in the neighboring groups of triangles has not been selected, if any triangle in the neighboring groups of triangles has not been selected, returning to block (b7), or if all triangles in the neighboring groups of triangles have been selected, going to block (b11);

(b11) determining if the angle sub-range in which the maximum included angle falls is the most detailed level;

(b12) dividing each triangle in the triangle data structure to three sub-triangles by connecting three vertices of the triangle and an intersection of two middle lines of two sides of the triangle, if the angle sub-range in which the maximum included angle falls is not the most detailed level;

(b13) determining an included angle between a normal vector of each sub-triangle and a normal vector of the sub-triangle's neighboring sub-triangle, and determining a new maximum included angle and an angle sub-range in which the new maximum included angle falls;

(b14) returning to block (b11) to determine if the angle sub-range in which the new maximum included angle falls is the most detailed level, and further dividing the sub-triangles according to blocks (b12)-(b14) until an angle sub-range in which a new maximum included angle falls is the most detailed level; and (b15) dividing the triangles in other regions of the curved surface according to subdivision processing from blocks (b4)-(b14) of the neighboring groups of triangles of the first 2D vertex.

7. The storage medium as claimed in claim 6, wherein block (c) comprises:

(c1) constructing a plurality of 3D bounding boxes for all 3D vertices in the 3D data structure, wherein each 3D vertex of each triangle falls in a corresponding 3D bounding box;

(c2) selecting a 3D vertex from the 3D data structure, and constructing two half-lines along a positive and a negative direction of a normal vector of the selected 3D vertex;

(c3) reading neighboring space bounding boxes of a bounding box in which the selected 3D vertex falls, to obtain a plurality of triangles having vertices contained in the neighboring space bounding boxes;

(c4) determining intersections of the two half-lines and the plurality of triangles;

(c5) determining a triangle as a surface triangle if the triangle has no intersection with the two half-lines, or determining the triangle as an inner triangle if the triangle has an intersection with either of the two half-lines; and (c6) determining display or hiding status information of triangles in other regions of the curved surface according to determination processing from blocks (c2)-(c5).

8. The storage medium as claimed in claim 6, wherein block (d) comprises:

(d1) reading a point having the minimal coordinate value and a point having the maximum coordinate value in the viewport, so as to determine a display range of the viewport;

(d2) reading display and hiding status information of all triangles of the curved surface; and (d3) displaying the surfaces triangles of the curved surface in the viewport.

9. The storage medium as claimed in claim 6, wherein the storage medium is a smart media card, a secure digital card, or a compact flash card.

10. The storage medium as claimed in claim 6, wherein the operations on the viewport comprise zooming in, zooming out, and rotations.

* * * * *